United States Patent [19]

Toledo

[11] 3,736,576

[45] May 29, 1973

[54] PLATED WIRE MAGNETIC MEMORY DEVICE

[75] Inventor: Emil Toledo, Natick, Mass.

[73] Assignee: Raytheon Company, Lexington, Mass.

[22] Filed: Nov. 27, 1970

[21] Appl. No.: 93,333

[52] U.S. Cl. ....................... 340/174 PW, 340/174 ZB

[51] Int. Cl. ............................................ G11c 11/14

[58] Field of Search .................. 340/174 ZB, 174 PW

[56] References Cited

UNITED STATES PATENTS

| | | | |
|---|---|---|---|
| 3,213,431 | 10/1965 | Kolk, Jr. et al. | 340/174 ZB |
| 3,535,703 | 10/1970 | Rork | 340/174 ZB |
| 3,378,823 | 4/1968 | Kaufman et al. | 340/174 PW |
| 3,466,631 | 9/1969 | Wang | 340/174 ZB |
| 3,370,979 | 2/1968 | Schnuckenbecker | 340/174 ZB |
| 3,451,793 | 6/1969 | Matsushita | 340/174 ZB |

*Primary Examiner*—Stanley M. Urynowicz, Jr.
*Attorney*—Milton D. Bartlett, Joseph D. Pannone, Herbert W. Arnold and David M. Warren

[57] ABSTRACT

An electropolished, copper plated, beryllium copper wire is plated with a composite coating of a nickel-iron-cobalt alloy. Such coating consists of a layer having a high anisotropic field parameter, of the order of 6 oersteds or higher, adjacent the surface of the wire, superimposed by a layer having a lower anisotropic field parameter, of the order of 4 oersteds or less. The wire is plated in two plating cells, the first of which is provided with a plurality of passages directing the flow of a plating electrode with a major component of flow across the wire and a minor component of flow in one direction along the wire. The second plating cell is provided with a plurality of passages directing the flow of a plating electrolyte substantially transverse to the wire. The electrolyte supplied to the first cell contains salts of iron, nickel and cobalt, with cobalt being present in a relatively high concentration. A similar electrolyte is supplied to the second cell except that its maximum concentration of cobalt is about one fifth of that of the first electrolyte.

8 Claims, 9 Drawing Figures

PLATED WIRE MAGNETIC MEMORY DEVICE

The invention herein described was made in the course of or under a contract or subcontract there under, (or grant) with the Department of Defense.

BACKGROUND OF THE INVENTION

1. Field of the Invention

Magnetic memory devices plated with magnetic materials and a process and apparatus for producing such devices.

2. Description of the Prior Art

Plated wire memory devices are those in which information is permanently stored in the magnetization, in a preferred direction, of a magnetic coating plated on a conductor wire. While such devices are known in the prior art, they have been of limited effectiveness. The effectiveness of such a device depends on its ability to produce high signal output in response to read out impulses but which retain the level of the stored magnetic information undiminished after long periods of repeated read out operations. This property is termed nondestructive read out, usually referred to as NDRO. The NDRO properties of a plated wire memory device are directly related to the magnitude of the anisotropy field parameter of the plated magnetic material. This parameter is well known and is represented by the symbol $H_K$ and expressed numerically in oersteds. The strength of the output signal, however, depends on the ease with which the stored magnetic vector can be tilted temporarily from its position along the preferred magnetic direction. While low values of $H_K$ make tilting of the magnetic vector relatively easy, such low values make for poor NDRO properties. The prior art has encountered difficulties in reconciling these two opposing requirements for an effective device.

Prior art attempts at producing satisfactory magnetically plated wire memory devices have suffered from such additional problems as poor reproducibility, inconsistent properties, low yields of acceptable lengths of plated wires, and the inability of the plated wire to store closely spaced magnetic bits of information. Such wires are said to have low ABI resistance. The term ABI stands for "adjacent bit interference".

SUMMARY OF THE INVENTION

The present invention overcomes the defects and problems of the prior art by providing a substrate, such as a wire, plated with a composite coating of magnetic material. The layer of such coating adjacent the surface of the substrate has a high anisotropic field parameter $H_K$ of the order of about 6 oersteds or higher. The outer layer of the coating has a low anisotropic field parameter $H_K$ of the order of about 4 oersteds or less. Good coupling between the two layers is provided by forming the second layer with a grain size at the interface between the two layers which is substantially smaller than the grain size of the first layer at such interface. Coupling is also enhanced by a gradation in the magnitude of $H_K$ of the first layer from a high value adjacent the surface of the substrate to a less high value at the interface between the two layers. The wire substrate is plated in two plating cells, the first of which is supplied with a plating electrolyte which deposits the high $H_K$ layer and the second, of which deposits the low $H_K$ layer. This may be accomplished by providing the first cell with an electrolyte containing iron, nickel and cobalt salts with the cobalt being in sufficient concentration to deposit an iron-nickel-cobalt alloy containing about 5 percent or more of cobalt. The second cell is provided with a similar electrolyte except that the cobalt salt concentration is reduced so that the average cobalt content of both deposited layers is of the order of about 3.5 percent or less. The second layer contains about 0.5 to 1.5 percent cobalt. Also the first cell is provided with a plurality of passages which direct the electrolyte primarily transversely to the wire but the axes of which are tilted so as to produce a component of flow in one direction along the wire. The second cell has a similar set of passages except that their axes are at a substantially different angle than that of the first cell and preferably at right angles to the axis of the wire. After the plating is completed, the wire is rinsed and then heat treated at between 300° to 400°C. with a biasing circumferential magnetic field to establish the preferred magnetic direction circumferentially of the wire.

DETAILED DESCRIPTION OF THE INVENTION

Figures 1, 6, 9:
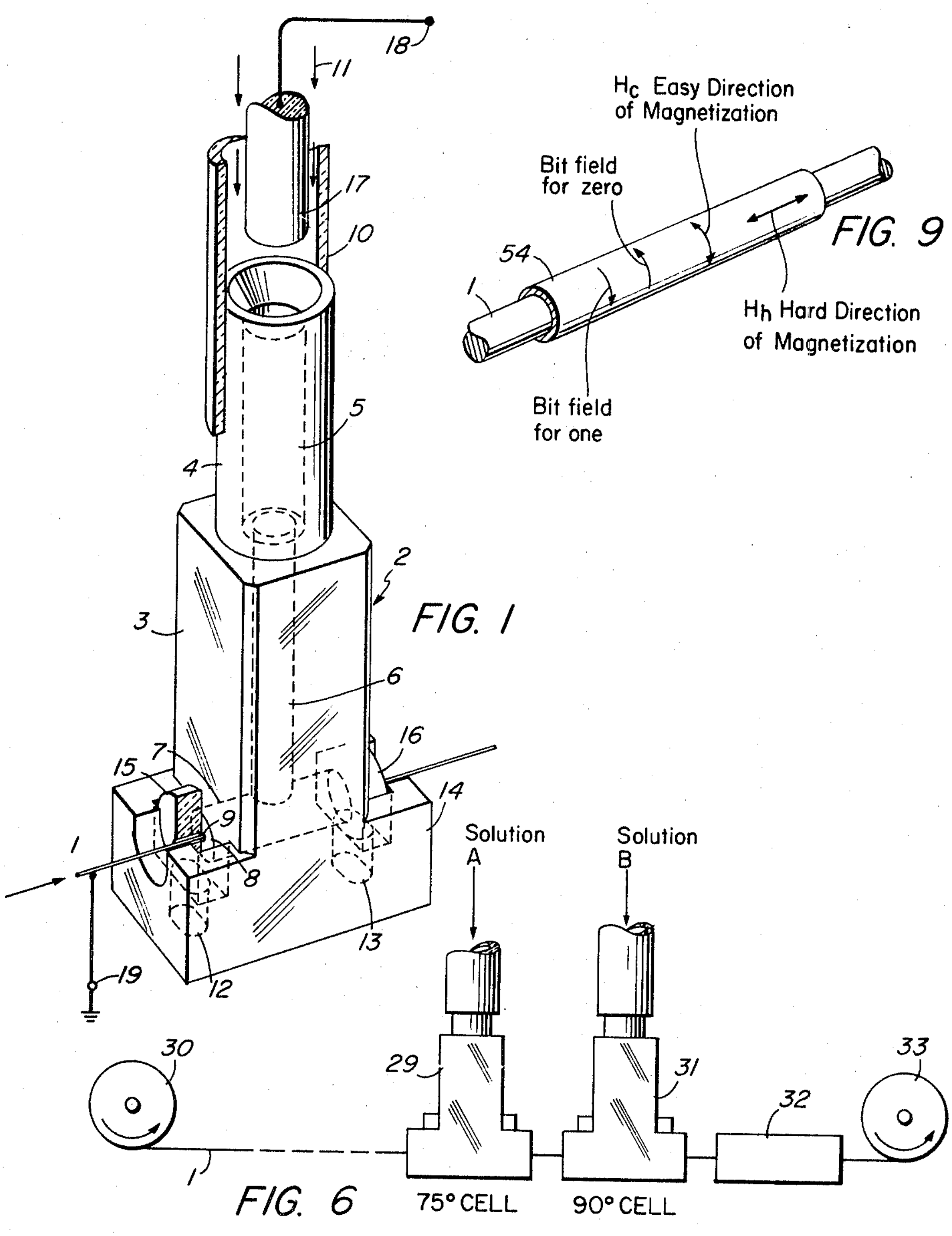
FIG. 1 is a perspective view of a plating cell used in producing a plated wire memory device.
FIG. 6 is a diagrammatic showing of a plating system incorporating the structures of FIGS. 3 and 5.
FIG. 9 is a perspective view of a short length of the resultant plated wire with the coating stripped from the ends of the wire.

In the arrangement shown in FIG. 1, a beryllium copper wire 1, which has been electropolished and copper plated, is passed through a plating cell 2. The wire is quite fine and may have, for example, a diameter of about 0.005 inches. The main body of the cell 2 consists of a block of polyester plastic having an upper portion 3 terminating in a tubular end 4 through which a passage 5 connects with a passage 6 through the portion 3. Extending horizontally through the base of portion 3 is a passage 7 in which is placed a teflon insert 8 provided with a central bore 9 through which the wire 1 passes. A flexible tube 10 is fitted to the top of the tubular end 4. A magnetic plating electrolyte 11, to be described below, is pumped through tube 10, flows through passages 5 and 6, through teflon insert 8 (the structure of which will be described below) around the wire 1 and is discharged through discharge passages 12 and 13 extending through the bottom portion 14 of the block of polyester plastic. The teflon insert 8 is retained in place by a pair of plastic discs 15 and 16 fitting into corresponding sockets formed in the bottom portion 14.

An electrode 17 is inserted in the plating electrolyte stream 11 in tube 10 and is connected to the positive terminal 18 of a source of plating current. The negative or ground terminal 19 of that source is connected to the wire 1.

Figure 3:
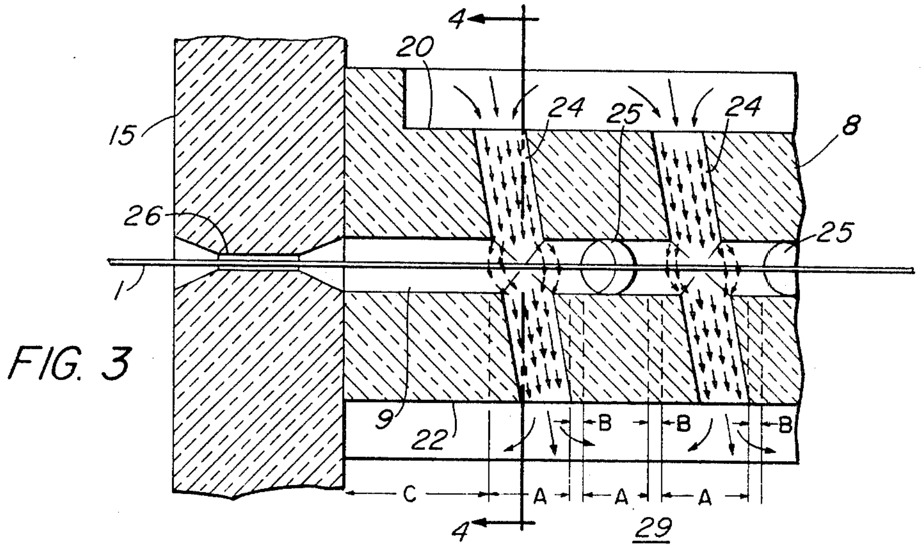
FIG. 3 is a cross-section taken along line 3—3 of FIG. 2, but on a larger scale.
Figure 2:
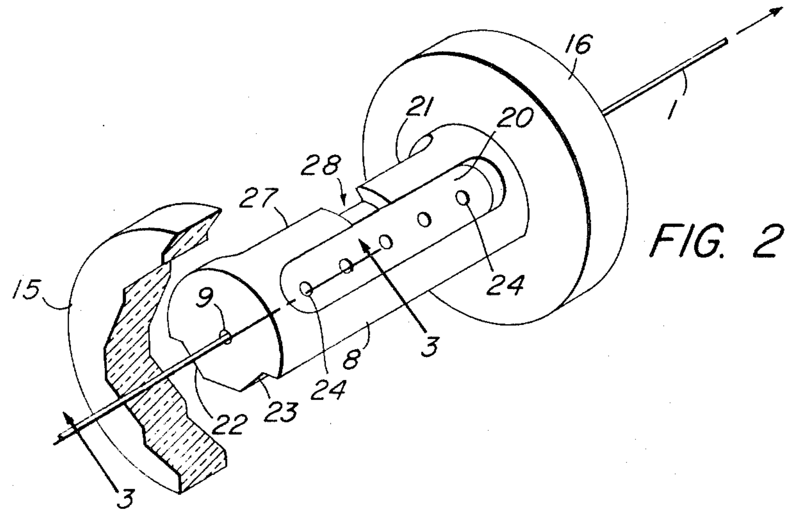
FIG. 2 is a perspective view on a larger scale of an insert used in the cell of FIG. 1, with a portion of an end disc broken away.
Figure 4:
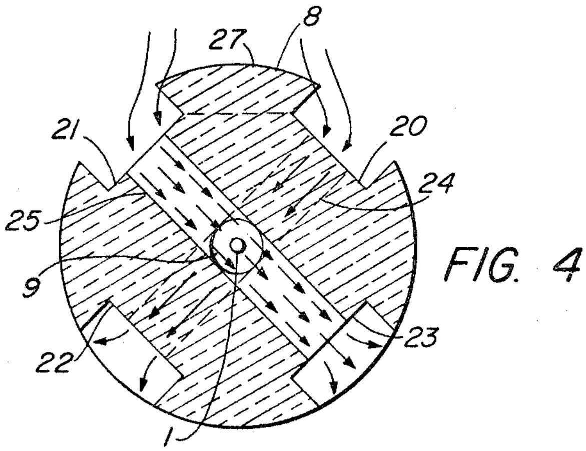
FIG. 4 is a cross-section taken along line 4—4 of FIG. 3 but on a somewhat smaller scale.

The details of teflon insert 8 are shown in FIGS. 2, 3 and 4. That insert is formed from a cylinder of teflon which is provided with an upper pair of flat recesses 20 and 21 and a corresponding pair of flat lower forces 22 and 23 diagonally related to the recesses 20 and 21. A plurality of passages 24 are bored directly through the insert 8 from recess 20 to face 22 and a similar set of passages 25, disposed substantially at right angles to passages 24, are bored directly through insert 8 from recess 21 to face 23. The central bore 9 extends longitudinally through insert 8 and interrupts the passages 24 and 25. Each plastic disc 15 and 16 is provided with a restricted central bore 26 which permits passage of wire 1 but which inhibits free flow of the plating electrolyte.

A ridge 27, which is left on insert 8 between recesses 20 and 21, is cut away to provide a gap 28 which is adapted to lie below the passage 6. Gap 28 affords free flow of the plating electrolyte from passage 6 into the recesses 20 and 21 whereupon such electrolyte flows through passages 24 and 25 across and around the wire 1 in central bore 9 and is discharged from lower faces 22 and 23 into the discharge passages 12 and 13. The arrows in FIG. 3 represent generally the direction of flow of the plating electrolyte.

In the embodiment in FIG. 3, the passages 24 and 25 are displaced from a direction at right angles to the axis of wire 1 by an angle which is sufficient to impart a component of flow of the plating electrolyte in one direction along the wire 1 as well as providing the principal component of flow across the wire 1. In the preferred embodiment the angle displacement of the passages 24 and 25 from the right angle direction is about 15°. Therefore the axis of each passage 24 and 25 is about 75° from the axis of the wire 1. Other angular displacements, e.g. as high as 30° from a right angle to the wire, have been used with good results.

The plating cell of FIG. 3, generally designated as 29 is incorporated in a system as shown diagrammatically in FIG. 6. In this system the wire 1 is supplied from a reel 30. Wire 1, after being appropriately electropolished and copper plated, enters cell 29 and is plated with a Solution A to be described below. After passing out of cell 29, wire 1 enters a second plating cell 31, the structure of which is shown in FIG. 5.

Figure 5:
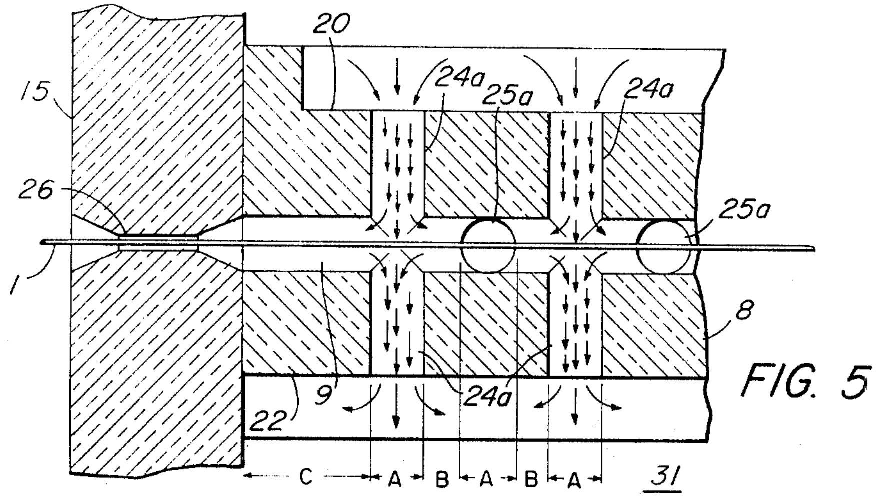
FIG. 5 is a view similar to that of FIG. 3, showing a slightly different form of the insert of FIG. 2.

The structure of FIG. 5 differs from the structure of FIG. 3 solely in that the passages extending from recesses 20 and 21 to faces 22 and 23 are disposed at right angles to the axis of wire 1. Therefore in FIG. 5 the same reference numbers as used in FIG. 3 have exactly the same significance as in FIG. 3, but the transverse passages are designated as **24*a* and 25*a* in FIG. 5. Thus it will be seen that there is no longitudinal component of flow of the plating electrolyte in FIG. 5. Instead the plating electrolyte occupies the spaces between adjacent passages 24*a* and 25 in a somewhat random and turbulent pattern. The cell of FIG. 5** is supplied with a solution B as its electrolyte.

After the plating has been completed, wire 1 is rinsed and heat treated in a final stage 32, as will be described below, after which it is taken up by a reel 33.

Pursuant to this invention, wire 1 is plated with a composite magnetic film having the desired improved properties. For this purpose plating solutions A and B are utilized. These solutions are of the general nature as described and claimed in the copending application Ser. No. 882,332 filed Dec. 4, 1969. In the preferred embodiment of this invention the two solutions comprise the following common materials:

| | |
|---|---|
| 35 gms / liter | $H_3BO_3$ |
| 0.1 to 0.3 gms / liter | O benzoic sulfamide |
| 5 gms / liter | sodium laurel sulfate |
| 120 gms / liter | nickel sulfate · $6H_2O$ |
| 40 gms / liter | nickel chloride · $6H_2O$ |
| 12 to 14 gms / liter | $Fe(NH_4)_2(SO_4)_2 \cdot 6H_2O$ |

Cobalt, as cobalt bromide, is added to the above at a five to one ration between solution A and solution B. Typical quantities to produce the desired film are 60 grams of cobalt bromide for solution A and 12 grams of cobalt bromide for solution B.

Many of the advantages of this invention reside in its ability to control accurately and reliably the anisotropic field parameter $H_K$ of the film of the nickel-iron-cobalt alloy deposited on wire 1. In this invention the film has a high value of $H_K$ adjacent the surface of the wire while $H_K$ decreases in value progressively through to the outside of the film. For the purposes of this invention, high values of $H_K$ may be considered as about 6 and above, while low values may be considered at about 4 or below.

Referring to FIG. 5, it will be noted that there are three regions of substantially different flow patterns. In regions A directly in line with the passages **24*a* and 20 a, the flow of electrolyte is normal to the surface of wire 1 thus producing a maximum of flow velocity around the wire 1 and a minimum of residence time of the electrolyte at the wire 1 during which the deposition of ions on the wire 1 might change the relative proportions of the constituents of the electrolyte. In regions B located between successive holes 24*a* and 25*a*, the flow of electrolyte is somewhat more turbulent than in the A regions, the rate of flow slower and the residence time of the electrolyte longer. In region C which is located at the front end of central bore 9 before the first passage 24*a*,** the flow is even slower, and the residence time of the electrolyte longer.

In FIG. 3, due to the directed flow of electrolyte along the wire 1 provided by the angular disposition of the passages 24 and 25, the B regions are substantially reduced. By the proper choice of the angular disposition of the passages 24 and 25 and of the velocity of the incoming electrolyte, the B regions may be reduced virtually to zero. Therefore, in FIG. 3 structure, a much more uniform disposition can be produced.

It has been found that, in a nickel-iron-cobalt alloy wire plating system, iron plates at a rate approximately one to two times that of cobalt and 8 to 15 times that of nickel. Therefore with a given electrolyte, the longer the residence time of the electrolyte at the wire 1, iron will be depleted faster resulting in an increase in nickel and a smaller increase in cobalt. As the iron content goes down, $H_K$ decreases while as the nickel and cobalt content go up $H_K$ goes up. Therefore in those regions of the plating cells in which he velocity of flow of electrolyte is slow, there is a tendency of $H_K$ to increase. Thus the A regions tend to produce lower values of $H_K$ than the C and B regions. In addition, it has been found that where the cobalt concentration is low, e.g. about 3.5% cobalt or less in the deposited film, the variations in residence time of the electrolyte has very little effect on the value of $H_K$. For example, solution B represents an electrolyte having such a low cobalt concentration, while solution A is sufficiently rich in cobalt so that the velocity of the flow of electrolyte around the wire 1 has a marked effect on the value of $H_K$ in the deposited film. It is in the region where the deposited alloy contains about 5 percent or more of cobalt that alloys having a high value of $H_K$ are deposited, and it is with solutions that are sufficiently rich in cobalt to produce such a deposit that the rate of flow of the electrolyte produces variations in the value of $H_K$.

Figure 7:
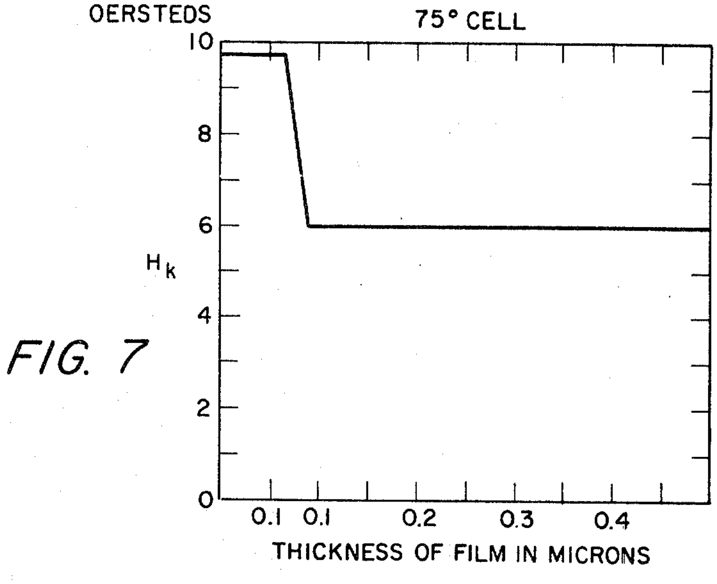
FIGS. 7 and 8 are graphs showing the $H_K$ characteristics produced in the coatings deposited in the two cells shown in FIG. 6.
Figure 8:
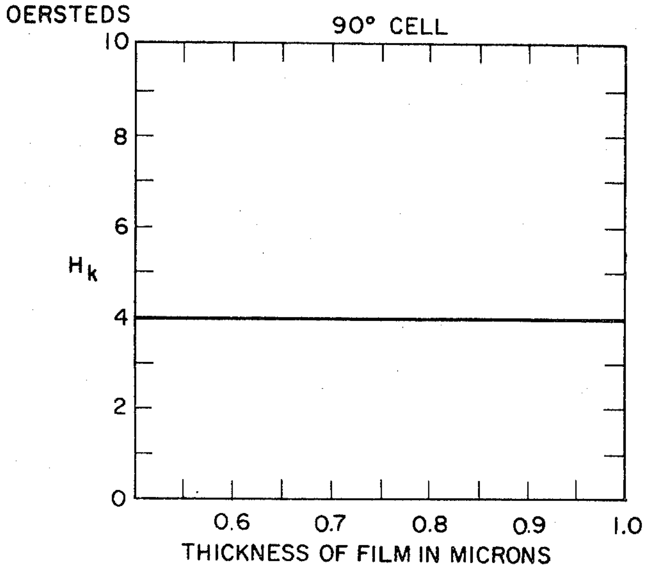

FIGS. 7 and 8 show the results obtained in the embodiment described above. FIG. 7 represents the results obtained in cell 29, and FIG. 8 represents the results obtained in cell 31. In these FIGS. the thickness of the deposited film in microns is plotted along the horizontal axes, and the value of $H_K$ in oersteds is plotted along the vertical axes.

In the C region of the 90° cell 29, the flow velocity of the solution A is so low that a film having a $H_K$ value of about 10 is deposited to a thickness of somewhat less than 0.1 micron. This is followed by a transaction between regions C and A in which the value of $H_K$ drops to about 6 due to the higher velocity of flow in the remainder of cell 29. As described above, such higher velocity is virtually uniform due to the angular disposition of the passages 24 and 25, and therefore the rest of the film deposited in cell 29 remains substantially at the $H_K$ value of 6 to a thickness of about 0.5 microns.

When the wire 1 leaves the 75° cell 29 and enters the 90° cell 31, FIG. 8 shows that the deposition of the film continues to an additional depth of about 0.5 microns with an $H_K$ value of about 4. As pointed out above, solution B is so low in cobalt that the presence of substantial B and C regions in cell 31 do not produce substantial changes in the $H_K$ value of the deposited film.

It will be noted that by the above process a plated wire is produced having a high $H_K$ film adjacent the surface of the wire 1 and a low $H_K$ film adjacent the outside of the film, the thicknesses of the high and low $H_K$ layers being substantially equal. Also within the high $H_K$ layer itself there is a decreasing value of $H_K$ from the surface of the wire 1 outwardly.

After the plated wire emerges from the cell 31, it enters the finishing stage 32 where it is first rinsed clean the surface of the plated wire. Thereupon the wire is heated to a temperature of about 300° to 400°C while a current is passed along the wire to create a circumferential magnetic field that establishes a preferred or easy direction of magnetization direction circumferentially around the wire and a hard direction of magnetization along the wire. The result is illustrated in FIG. 9 which shows the wire 1 plated with the composite magnetic film 54, shown partially stripped from the wire 1, and in which the hard direction of magnetization is shown by the arrows $H_h$ and the easy direction of magnetization by the arrows $H_c$.

Information is stored in the coating by magnetizing a short section of the coating circumferentially in one direction for a bit of one, as illustrated in FIG. 9, and in the opposite circumferential direction for a bit of zero. To read the stored information a field is set up at right angles to the circumferential field which tilts the magnetization vector from its circumferential rest position toward the axis of the wire. When the tilting field is removed, the magnetization vector returns to its original rest position under the influence of the anisotropy field of the high $H_K$ layer. The resultant charges influx produce voltage charges in the wire 1 which enable the information to be sensed at the ends of the wire.

The nondestructive readout (NDRO) property of the plated wire depends on the degree to which the magnetic vector returns undiminished to its original circumferential position, while the output produced on each readout depends on the ease with which the magnetic vector may be tilted along the wire. The present invention, in effect, separates these two properties by producing a two film layers, the underlying high $H_K$ layer imparting excellent NDRO properties to the wire while the overlying low $H_K$ layer increases the ease with which the field may be tilted thus substantially increasing the magnitude of the readout signal. Furthermore the process described above enables the $H_K$ of each layer to be easily and reliably controlled.

Plated wires according to this invention also exhibit excellent coupling between the high and low $H_K$ layers. This is due, at least partially, to the fact that although the crystal grain size usually increases from the inside to the outside of a plated layer, such increase is interrupted at the interface between the high $H_K$ and the low $H_K$ layer at which point the grain size of the low $H_K$ layer is substantially smaller than the grain size of the top of the high $H_K$ layer. This is believed to be due to the differences in the plating action produced in the two different types of plating cells 29 and 31. When the wire passes from cell 29 to 31, the angle at which the ions deposited in the wire changes due to the difference in the angular disposition of the passages 24 and 25 in cell 29 and the passages **24*a* and 25*a* in cell 31.** Therefore the plating of the low $H_K$ film occurs on different faces of the underlying crystals of the high $H_K$ film. Thus the normal growth in the size of the crystal grains is interrupted, and the low $H_K$ film starts with the characteristic small grain size of a newly plating layer. The remarkable increase in its ABI resistance may be due, at least in part, to this factor. The term ABI stands for "adjacent bit interference," the resistance to which determines the ability of a magnetic storage element to distinguish between adjacent bits of stored information. The present plated wire permits the storage of increased amounts of information in any given length of wire as contrasted with prior art structures.

The gradation of the high $H_K$ layer from a high $H_K$ to a less high $H_K$ value as the low $H_K$ layer is approached is also believed to contribute to the effectiveness of the coupling between the two layers.

Various aspects of this invention may be useful in other relationships than those described above. For example, composite magnetic films according to this invention may be formed on other types of substrates than a conductive wire, such as tapes, discs and the like. Also the cell structure of the type shown in FIG. 3 may be useful in achieving accurate control of other types of magnetic plating processes. Since the angle at which the axes of the passages **24*a* and 25*b* in FIG. 5 are disposed with respect to wire 1 has virtually no effect on the value of $H_K$ in the second layer of the deposited film, practically any such angle may be utilized except that it should be substantially different from the angle at which the axes of passages 24 and 25 in FIG. 3** are disposed. It is primarily for this reason that the right angle disposition of the axes of the passages in the second cell is preferred. Other variations in the details of this invention and in its applications will suggest themselves to those skilled in the art.

What is claimed is:

1. A magnetic memory device comprising:

a substrate having a longitudinal axis on which is formed a magnetic coating which has a relatively high anisotropic field characteristic adjacent the surface of the substrate and a lower anisotropic field characteristic adjacent the outer surface of said coating;

both said high and said low characteristics providing a preferred direction of magnetization substantially transverse to said longitudinal axis; and the grain size of the portion of said coating having said relatively high anisotropic field characteristic being substantially larger than the grain size of the portion of coating having said lower anisotropic field characteristic in the region of the interface between said portions.

2. A magnetic memory device as in claim 1 in which said coating comprises two layers, the first of which is adjacent the surface of said substrate and has a relatively high anisotrophic field characteristic and the second of which is superposed on said first layer and has a lower anisotropic field characteristic.

3. A magnetic memory device as in claim 2 in which said layers are of the same order of thickness.

4. A magnetic memory device as in claim 2 in which said coating comprises an iron-nickel-cobalt alloy and in which the cobalt content is substantially higher in said first layer than in said second layer.

5. A magnetic memory device as in claim 2 in which the value of the anisotropic field characteristic of said first layer decreases from the surface of said substrate outwardly.

6. A memory device according to claim 1 in which said relatively high anisotropic field characteristic comprises the substantially saturation magnetic field along said axis has a value of about 6 oersteds or higher and in which said lower anisotropic field characteristic has a value of about 4 oersteds or lower.

7. A magnetic memory device as in claim 1 in which said substrate comprises a conductive wire.

8. A magnetic memory device as in claim 7 in which said coating has a preferred direction of magnetization circumferentially of said wire.

* * * * *

UNITED STATES PATENT OFFICE

CERTIFICATE OF CORRECTION

Patent No. 3,736,576 Dated May 29, 1973

Inventor(s) Emil Toledo

It is certified that error appears in the above-identified patent and that said Letters Patent are hereby corrected as shown below:

Column 3, line 32, change "angle" to -- angular --.

Column 4, line 58, change "he" to -- the --.

Column 5, line 41, after "rinsed" insert -- to --.

Claim 2, Column 7, line 19, change "anisotrophic" to -- anisotropic --.

Signed and sealed this 9th day of April 1974.

(SEAL)
Attest:

EDWARD M.FLETCHER,JR.
Attesting Officer

C. MARSHALL DANN
Commissioner of Patents